United States Patent
Pruitt et al.

(10) Patent No.: US 11,326,376 B2
(45) Date of Patent: May 10, 2022

(54) ROOF SUPPORT SYSTEM FOR AN ELECTRICAL DISTRIBUTION SYSTEM ENCLOSURE

(71) Applicant: The Durham Co., Lebanon, MO (US)

(72) Inventors: Alva Glen Pruitt, Houston, MO (US); Kenneth J. Driver, Elk Creek, MO (US); Bobby D. Dixon, Houston, MO (US); Jason T. Derrickson, Licking, MO (US)

(73) Assignee: The Durham Co., Lebanon, MO (US)

( * ) Notice: Subject to any disclaimer, the term of this patent is extended or adjusted under 35 U.S.C. 154(b) by 362 days.

(21) Appl. No.: 16/428,863

(22) Filed: May 31, 2019

(65) Prior Publication Data

US 2020/0011098 A1   Jan. 9, 2020

Related U.S. Application Data

(60) Provisional application No. 62/694,699, filed on Jul. 6, 2018.

(51) Int. Cl.
| | | |
|---|---|---|
| *E05C 17/08* | (2006.01) | |
| *E05F 1/10* | (2006.01) | |
| *E05F 11/02* | (2006.01) | |
| *H02B 1/38* | (2006.01) | |

(52) U.S. Cl.
CPC .......... *E05C 17/085* (2013.01); *E05F 1/1091* (2013.01); *E05F 11/02* (2013.01); *H02B 1/38* (2013.01)

(58) Field of Classification Search
CPC ....... E05C 17/085; E05F 1/1091; E05F 11/02; E04D 13/00; H02B 1/38
See application file for complete search history.

(56) References Cited

U.S. PATENT DOCUMENTS

| | | | | |
|---|---|---|---|---|
| 1,242,736 A | * | 10/1917 | Sturtevant et al. ... | E05C 17/085 217/60 D |
| 1,324,094 A | * | 12/1919 | Zega ..................... | E05C 17/085 217/60 D |
| 2,076,860 A | * | 4/1937 | North .................... | E05C 17/085 217/60 C |
| 2,231,550 A | * | 2/1941 | Schallis ................ | E05C 17/085 217/60 F |
| 2,235,875 A | * | 3/1941 | Galamb ................ | E05C 17/085 217/60 R |
| 2,253,561 A | * | 8/1941 | Harden ................. | E05C 17/085 217/60 F |

(Continued)

*Primary Examiner* — Justin B Rephann

(57) ABSTRACT

A roof support system includes a support member configured to be mounted between a roof panel and a frame of an enclosure. The support member is movable to an extended position that supports the roof panel in an open position. A cam lock mechanism is operatively connected to the support member for releasably locking the support member in the extended position. In the extended position, a pin of the support member is received within a slot of the cam lock mechanism such that engagement of the pin with a closed end of the slot prevents the support member from moving from the extended position toward a retracted position. The cam lock mechanism includes a cam configured to rotate to a locking position that at least partially blocks an open end of the slot such that the pin of the support member is prevented from backing out of the slot.

17 Claims, 11 Drawing Sheets

(56) References Cited

U.S. PATENT DOCUMENTS

| | | | | | |
|---|---|---|---|---|---|
| 2,264,382 | A | * | 12/1941 | Keller | E05C 17/085 |
| | | | | | 217/60 F |
| 2,550,008 | A | * | 4/1951 | Freeman | E05C 17/085 |
| | | | | | 217/60 R |
| 2,551,415 | A | * | 5/1951 | Calling | E05C 17/085 |
| | | | | | 217/60 C |
| 2,566,182 | A | * | 8/1951 | Flynn | E05C 17/085 |
| | | | | | 217/60 E |
| 3,141,694 | A | * | 7/1964 | Birmingham | E05C 17/085 |
| | | | | | 292/263 |
| 4,096,347 | A | * | 6/1978 | Penczak | H02G 3/185 |
| | | | | | 174/486 |
| 4,790,580 | A | * | 12/1988 | Casilio | E05C 17/085 |
| | | | | | 292/262 |
| 5,465,557 | A | * | 11/1995 | Harte | B65B 31/02 |
| | | | | | 16/289 |
| 10,004,155 | B1 | * | 6/2018 | Bier | H02B 1/38 |

* cited by examiner

ROOF SUPPORT SYSTEM FOR AN ELECTRICAL DISTRIBUTION SYSTEM ENCLOSURE

CROSS-REFERENCE TO RELATED APPLICATION

This application claims priority to and the benefit of U.S. Provisional Patent Application Ser. No. 62/694,699, filed on Jul. 6, 2018 and entitled "HOT STICK OPERABLE ELECTRICAL DISTRIBUTION ROOF SUPPORT SYSTEM", which is incorporated herein by reference in its entirety.

BACKGROUND

Electrical distribution systems include enclosures that house various electrical components of the distribution system, for example switchgear (e.g., switching and interrupting devices such as circuit breakers, fuses, relays, etc.), panel boards, cables, control devices, instrumentation, metering devices, etc. The enclosures of electrical distribution systems provide security and environmental protection. The enclosures also provide a physical safety barrier. For example, distribution voltages of electrical distribution systems can range from 15 kV to 35 kV nominal system voltages with a high potential for arc flash due to line to ground or a line to line fault. The enclosures provide a physical barrier that protects linemen and other personnel from exposure to various electrically live components of the electrical distribution system.

Some known electrical distribution system enclosures include a hinged roof panel that is opened to enable access to the interior of the enclosure for installation, servicing (e.g., maintenance, etc.), and operation (e.g., reading instrumentation, metering devices, etc.) of the various electrical and/or other components of the electrical distribution system. But, the relatively large roof panels are heavy and therefore may be cumbersome to lift open and/or pose a safety risk to personnel. For example, roof panels that are lifted manually require two or more people to open, namely one to lift the roof panel and one or more other persons to engage props on opposite ends of the roof panel that hold the roof panel open. Moreover, high wind conditions can disengage the props such that the roof panel accidentally closes onto a person accessing the interior of the enclosure. The unexpected closure of the relatively heavy roof panel can potentially cause serious injury to such personnel. Some known roof panels are provided with one or more assist mechanisms (e.g., gas springs, etc.) that enable a single person to semi-automatically lift and thereby open the roof panel. But, the relatively heavy semi-automatic roof panels can be difficult for a single person to lift while remaining clear of potentially electrically live components of the electrical distribution system (e.g., electrically live components exposed through an open front of the enclosure, etc.). Moreover, the semi-automatic roof panels can accidentally close and thereby potentially injure personnel via outright failure of the assist mechanisms and/or wind conditions overcoming the forces provided by the assist mechanisms that hold the roof panel open.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one aspect, a roof support system is provided for an enclosure of an electrical distribution system. The roof support system includes a support member configured to be mounted between a roof panel of the enclosure and a frame of the enclosure. The support member is movable between an extended position and a retracted position. The extended position of the support member is configured to support the roof panel in an open position of the roof panel. The support member is configured to be in the retracted position when the roof panel is in a closed position of the roof panel. The support member includes a pin. The roof support system includes a cam lock mechanism operatively connected to the support member for releasably locking the support member in the extended position. The cam lock mechanism includes a rail having a slot. The pin of the support member is received within the slot when the support member is in the extended position such that engagement of the pin with a closed end of the slot prevents the support member from moving from the extended position toward the retracted position. The cam lock mechanism includes a cam configured to rotate between a locking position and a release position. The locking position of the cam at least partially blocks an open end of the slot such that the pin of the support member is prevented from backing out of the slot.

In another aspect, an enclosure for an electrical distribution system includes a frame having an interior compartment configured to hold at least one electrical component, and a roof panel mounted to the frame at a hinge. The roof panel is movable about the hinge between a closed position that closes an upper opening of the frame and an open position that exposes the interior compartment through the upper opening. The enclosure includes a roof support system that includes a support member configured to be mounted between the roof panel and the frame of the enclosure. The support member is movable between an extended position wherein the support member supports the roof panel in the open position and a retracted position when the roof panel is in the closed position. The support member includes a pin. The roof support system includes a cam lock mechanism operatively connected to the support member for releasably locking the support member in the extended position. The cam lock mechanism includes a rail having a slot. The pin of the support member is received within the slot when the support member is in the extended position such that engagement of the pin with a closed end of the slot prevents the support member from moving from the extended position toward the retracted position. The cam lock mechanism includes a cam configured to rotate between a locking position and a release position. The locking position of the cam at least partially blocks an open end of the slot such that the pin of the support member is prevented from backing out of the slot.

In another aspect, a method is provided for accessing an interior compartment of an electrical distribution system enclosure that includes a roof panel. The method includes lifting the roof panel from a closed position to an open position using a hot stick, locking a support member in an extended position wherein the support member supports the roof panel in the open position, and accessing the interior compartment of the enclosure. The method further includes unlocking the support member from the extended position, lifting the roof panel past the open position using the hot stick to thereby release the support member from the extended position, and lowering the roof panel to the closed position.

Other aspects, features, and advantages will become apparent from the following detailed description when taken in conjunction with the accompanying drawings, which are a part of this disclosure and which illustrate, by way of example, principles of the inventions disclosed.

BRIEF DESCRIPTION OF THE DRAWINGS

Corresponding reference characters indicate corresponding parts throughout the drawings.

DETAILED DESCRIPTION

Figure 1:
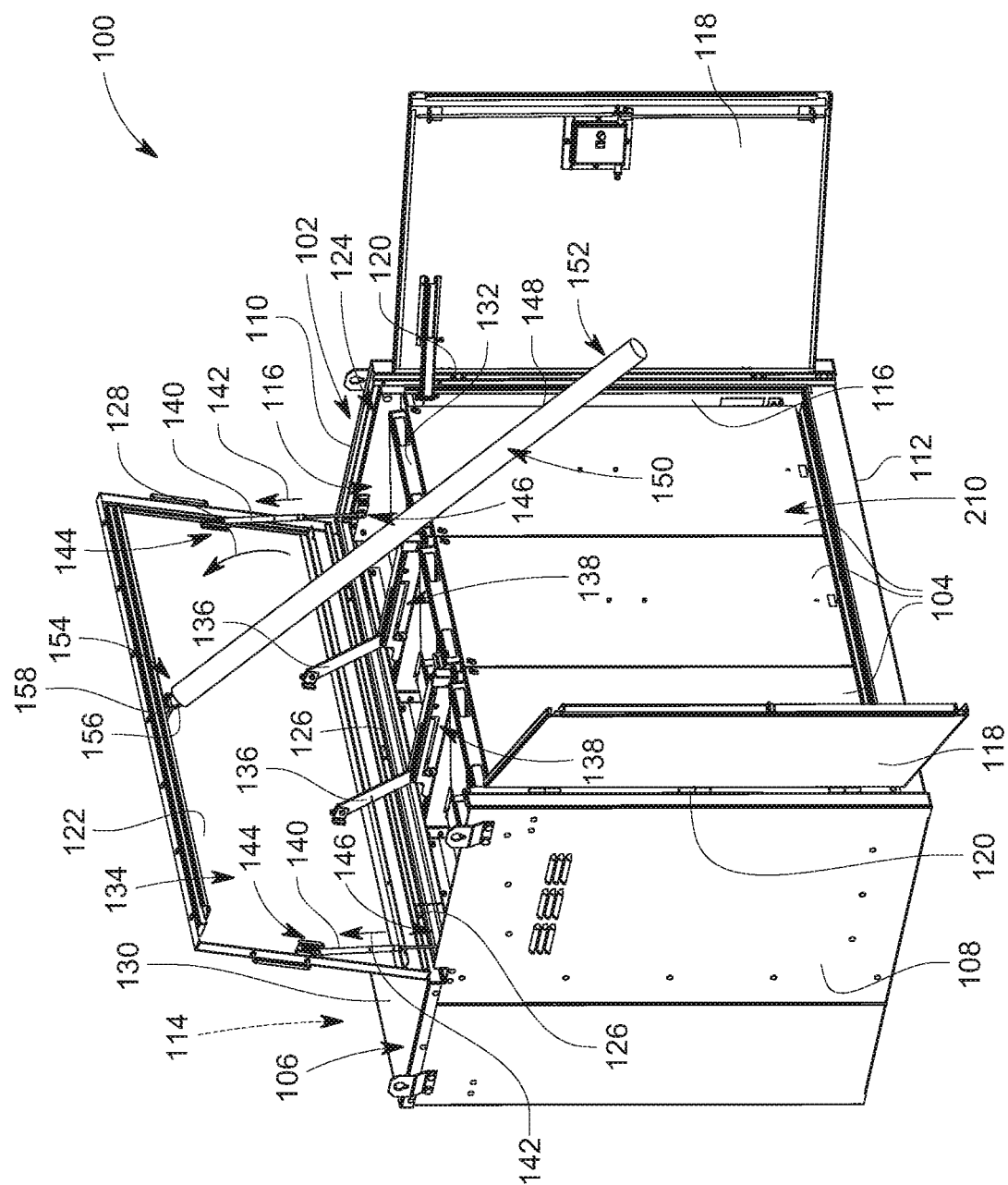
FIG. 1 is a perspective view illustrating an electrical distribution system according to an exemplary embodiment.

Certain embodiments of the disclosure provide a roof support system for an enclosure of an electrical distribution system. The roof support system includes a support member configured to be mounted between a roof panel of the enclosure and a frame of the enclosure. The support member is movable between an extended position and a retracted position. The extended position of the support member is configured to support the roof panel in an open position of the roof panel. The support member is configured to be in the retracted position when the roof panel is in a closed position of the roof panel. The support member includes a pin. The roof support system includes a cam lock mechanism operatively connected to the support member for releasably locking the support member in the extended position. The cam lock mechanism includes a rail having a slot. The pin of the support member is received within the slot when the support member is in the extended position such that engagement of the pin with a closed end of the slot prevents the support member from moving from the extended position toward the retracted position. The cam lock mechanism includes a cam configured to rotate between a locking position and a release position. The locking position of the cam at least partially blocks an open end of the slot such that the pin of the support member is prevented from backing out of the slot.

Certain embodiments of the disclosure provide a method for accessing an interior compartment of an electrical distribution system enclosure that includes a roof panel. The method includes lifting the roof panel from a closed position to an open position using a hot stick, locking a support member in an extended position wherein the support member supports the roof panel in the open position, and accessing the interior compartment of the enclosure. The method further includes unlocking the support member from the extended position, lifting the roof panel past the open position using the hot stick to thereby release the support member from the extended position, and lowering the roof panel to the closed position.

Certain embodiments of the disclosure provide a roof support system that reduces the amount of force required to lift and thereby open the roof panel of an electrical distribution system enclosure. Certain embodiments of the disclosure provide a roof support system that enables the roof panel of an electrical distribution system enclosure to be lifted and secured in an open position using less personnel. For example, certain embodiments of the disclosure provide a roof support system that enables the roof panel of an electrical distribution system enclosure to be safely lifted and secured in an open position by a single person.

Certain embodiments of the disclosure provide a roof support system that increases the safety of installation, servicing, and/or operation of components of electrical distribution systems. Certain embodiments of the disclosure thereby reduce the likelihood and severity of injury to personnel installing, servicing, and/or operating electrical distribution systems. For example, certain embodiments of the disclosure provide a roof support system that enables one or more personnel to safely lift and secure the roof panel of an electrical distribution system enclosure without being exposed to electrically live components (e.g., electrical components housed within the interior of the enclosure, portions of the enclosure carrying electricity, etc.). Moreover, and for example, certain embodiments of the disclosure provide a roof support system that can better withstand wind conditions and/or component failures such that the roof panels of electrical distribution systems are less likely to accidentally close onto personnel accessing interior compartments of electrical distribution system enclosures.

Figure 2:
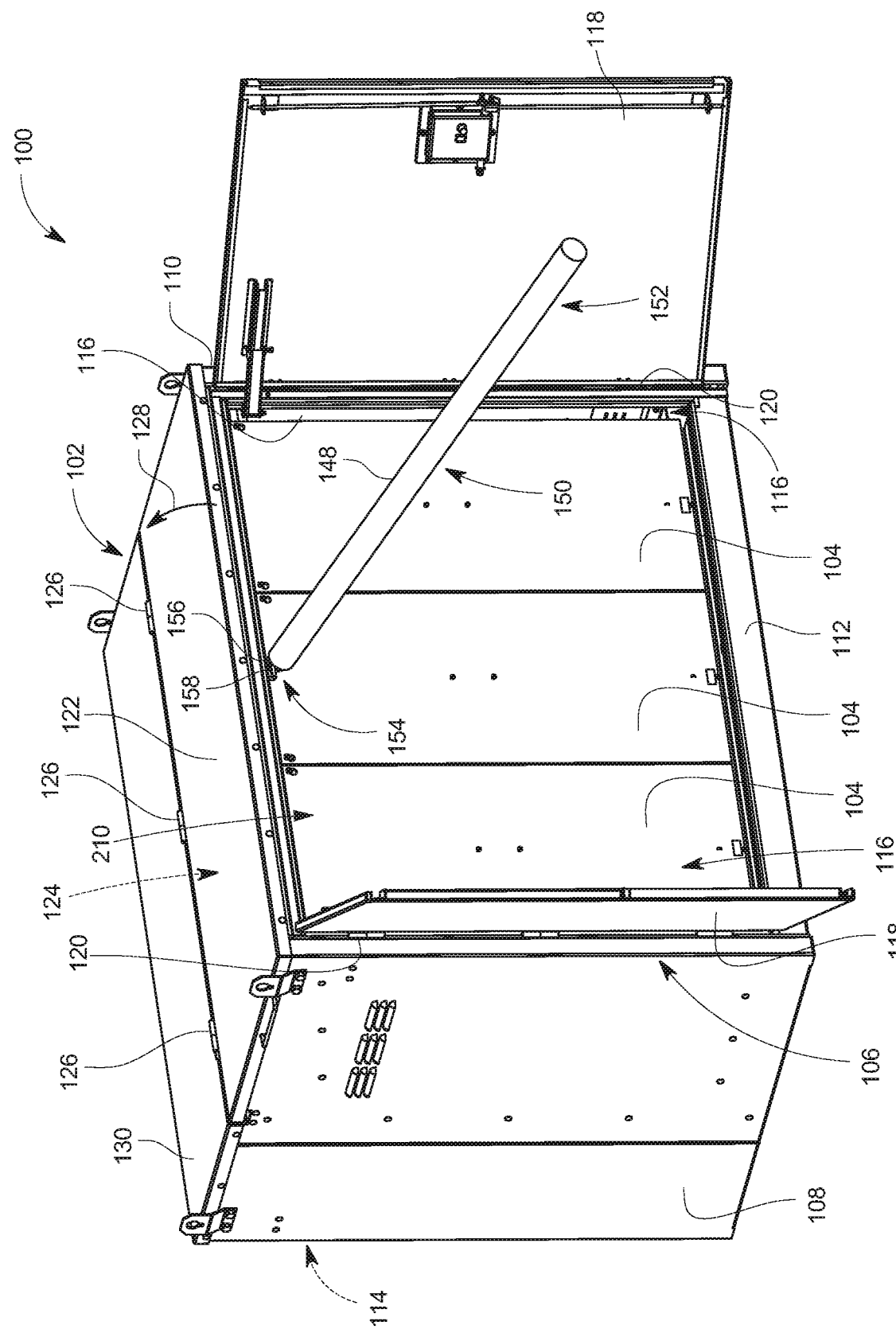
FIG. 2 is another perspective view of the electrical distribution system shown in FIG. 1 illustrating a roof panel in a closed position.

Referring now to FIGS. 1 and 2, an electrical distribution system 100 includes an enclosure 102 and one or more electrical components 104 housed within the enclosure 102. The enclosure 102 includes a frame 106 having a pair of opposite side panels 108 and 110, a lower panel 112, and a rear panel 114 (not visible in FIGS. 1 and 2). The frame 106 includes an interior compartment 116 that is defined between the panels 108, 110, 112, and 114. As shown in FIGS. 1 and 2, the interior compartment 116 holds the electrical component(s) 104 therein. Optionally, the enclosure 102 includes one or more front doors 118 mounted to the frame 106 for exposing the interior compartment 116 through a front opening 210 of the frame 106. Specifically, the front doors 118 are movable between closed positions (not shown) that close the front opening 210 of the frame 106 and the open positions shown in FIGS. 1 and 2 that expose the interior compartment 116 through the front opening 210. In the example shown herein, the front doors 118 are hingedly mounted to the frame 106 for moving (e.g., rotating, etc.) about hinges 120 between the open and closed positions. In other embodiments, one or more of the front doors 118 is moveable between the open and closed positions in another manner (e.g., a sliding door, etc.).

The enclosure 102 includes a roof panel 122 mounted to the frame 106 for exposing the interior compartment 116 through an upper opening 124 of the frame 106. Specifically, the roof panel 122 is mounted to the frame at one or more hinges 126 such that the roof panel 122 is movable (e.g., rotatable, etc.) about the hinge(s) 126 between a closed position shown in FIG. 2 and an open position shown in FIG. 1. In the closed position, the roof panel 122 closes that upper opening 124 of the frame 106, as is shown in FIG. 2. In the open position, the roof panel 122 exposes the interior compartment 116 of the frame 106 through the upper opening 124. As will be described in more detail below, the roof panel 122 is opened by applying a lifting force in an opening direction 128 to the roof panel 122 to rotate the roof panel 122 about the hinge 126 and thereby lift the roof panel 122 from the closed position to the open position.

In the exemplary embodiment, the frame 106 includes a fixed roof panel 130 that covers and thereby closes a portion of the upper opening 124 of the frame 106. In other examples, the roof panel 130 is not fixed in position, but rather is moveable between an open position and a closed position, for example similar to the hinged roof panel 122 or in another manner (e.g., a sliding panel, etc.). In still other embodiments, the roof panel 122 covers an approximate entirety of the upper opening 124 of the frame 106.

The frame 106 may include one or more other panels, members, supports, structures, dividers, and/or the like in addition or alternative to the panels 108, 110, 112, 114, and/or 130. For example, the exemplary embodiment of the frame 106 includes one or more internal supports 132 (not visible in FIG. 2) that extend between the side panels 108 and 110 (e.g., for strengthening the frame 106; for supporting one or more of the panels 108, 110, 112, 114, 122, and/or 130; for supporting one or more of the electrical components 104; for supporting one or more components of the roof support system 134 described below, etc.). Moreover, and for example, the exemplary embodiment of the frame 106 includes one or more dividers 170 (shown in FIG. 3) that facilitate separating, supporting, and/or the like the electrical components 104 housed within the enclosure 102. Although shown has having the shape of a parallelepiped, additionally or alternatively the enclosure 102 includes any other shape.

The enclosure 102 may contain (e.g., house, etc.) any number and type of electrical components 104, such as, but not limited to, switchgear (e.g., switching and interrupting devices such as circuit breakers, fuses, relays, etc.), panel boards, control devices, cables, instrumentation, metering devices, and/or the like. In addition to the electrical components 104, the enclosure 102 may contain non-electrical components (e.g., seals, mechanical supports, connectors, fasteners, other hardware, etc.) that facilitate supporting the operation of the electrical components 104.

Referring now solely to FIG. 1, the enclosure 102 includes the roof support system 134 that facilitates operation of the roof panel 122. As will be described in more detail below, the roof support system 134 includes one or more support members 136 having extended positions that support the roof panel 122 in the open position shown in FIG. 1, and one or more corresponding cam lock mechanisms 138 that releasably lock the support members 136 in the extended positions. Although two are shown, the roof support system 134 may include any number of the support members 136 and corresponding cam lock mechanisms 138.

Optionally, the roof support system 134 includes one or more gas springs 140 (sometimes referred to as "gas struts") mounted between the roof panel 122 and the frame 106. The gas springs 140 are operatively mounted between the roof panel 122 and the frame 106 such that the gas springs 140 are configured to provide an assisting force in the direction of the arrow 142. The assisting force provided by the gas springs 140 assist movement of the roof panel 122 from the closed position to the open position to thereby lessen the amount of force that must be applied by a person to open the roof panel 122 (e.g., to move the roof panel 122 from the closed position to the open position, etc.). In some examples, the amount of assisting force provided by the gas spring 140 is selected based on a weight of the roof panel 122, for example to enable a single person to open the roof panel 122.

In exemplary embodiment, opposite end portions 144 and 146 of the gas springs 140 are mounted to the roof panel 122 and a corresponding side panel 108 and 110, respectively, of the frame 106. But, additionally or alternatively the gas springs 140 are operatively mounted between the roof panel 122 and the frame 106 using any other arrangement, manner, and/or the like (e.g., between the roof panel 122 and the internal support 132, etc.) that enables the gas springs 140 to provide the assisting force.

Although two are shown, the roof support system 134 may include any other number of the gas springs 140. In addition or alternatively to the gas springs 140, the roof support system 134 may include any other type of assisting mechanism that is configured to provide the assisting force.

Referring again to FIGS. 1 and 2, the roof support system 134 optionally includes a hot stick 148 that enables a person (e.g., a user of the hot stick, etc.) to lift the roof panel 122 from the closed position to the open position without directly engaging (e.g., grasping, pressing against, pushing, etc.) the roof panel 122. The hot stick 148 includes an electrically insulative (e.g., non-conductive, etc.) body 150 that extends a length from a handle 152 to a tip 154. As is shown in FIG. 1, the tip 154 of the hot stick 148 engages the roof panel 122 such that a user holding the hot stick 148 (e.g., at the handle 152, at a location along the length of the body 150 between the handle 152 and the tip 154, etc.) can apply the lifting force in the opening direction 128 to the roof panel 122 using the hot stick 148 to thereby lift the roof panel 122 from the closed position to the open position. Accordingly, the hot stick 148 enables the user to apply the lifting force to the roof panel 122 without directly engaging the roof panel 122. The length of the body 150 of the hot stick 148 may have any dimension, which for example may be selected to enable the user to open (e.g., lift, etc.) the roof panel 122 from a predetermined distance away from the enclosure 102.

Optionally, the hot stick 148 is releasably connected or permanently joined to the roof panel 122. For example, in the exemplary embodiment, the tip 154 of the hot stick 148 includes a hook 156 that interlocks with a loop 158 of the roof panel 122 to releasably connect the hot stick 148 to the roof panel 122. Any other structure, fastener, connector, connection, manner, arrangement, and/or the like can be additionally or alternatively used to releasably connect or permanently join the hot stick 148 to the roof panel 122 (e.g., threaded fasteners, latches, adhesives, hinges, etc.). In other embodiments, the hot stick 148 is not connected or joined to the roof panel 122 (e.g., is carried by a person to the electrical distribution system 100 from a remote location, is stored nearby the electrical distribution system 100, etc.).

Figure 3:
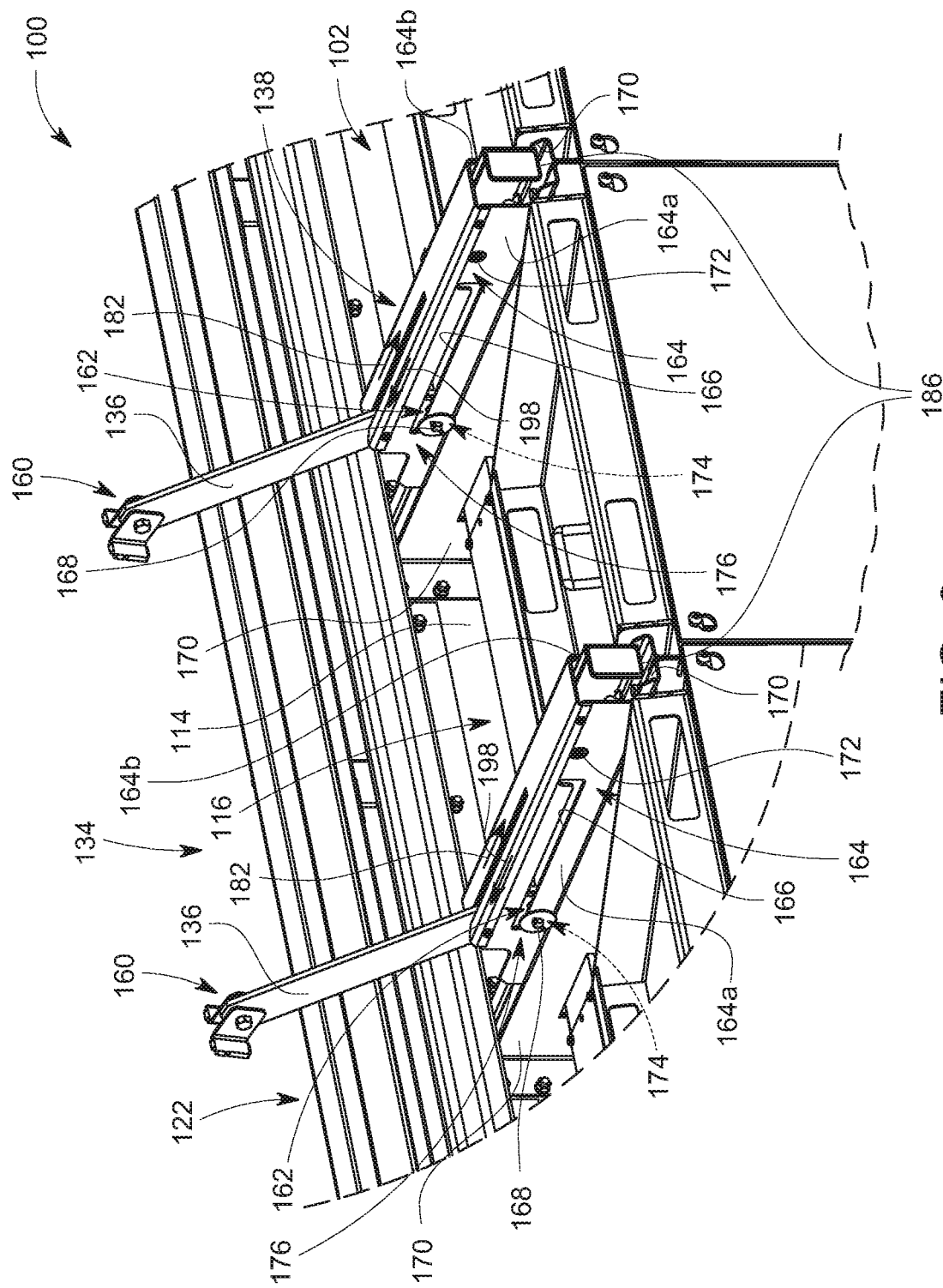
FIG. 3 is an enlarged perspective view of a portion of the electrical distribution system shown in FIGS. 1 and 2 illustrating a roof support system according to an exemplary embodiment.

Referring now to FIG. 3, the roof support system 134 includes the support members 136. Each support member 136 is a rigid member that extends a length from an end portion 160 to an opposite end portion 162. As shown in FIG. 3, the support members 136 are mounted between the roof panel 122 and the frame 106. Specifically, the end portions 160 of the support members 136 are hingedly mounted to the roof panel 122, while the opposite end portions 162 are slidably mounted to the frame 106 via corresponding rails 164 of the cam lock mechanisms 138, which in the exemplary embodiment are mounted on corresponding dividers 170 of the frame 106. In the exemplary embodiment, each cam lock mechanism 138 includes a pair of opposing rails 164a and 164b. Each rail 164 includes a channel 166 that extends along the length of the rail 164. The end portion 162 of each support member 136 includes a pin 168 that is received within the channels 166 of the rails 164a and 164b of the corresponding cam lock mechanism 138. In other embodiments, each cam lock mechanism 138 includes only a single rail 164a or 164b.

Figure 5:
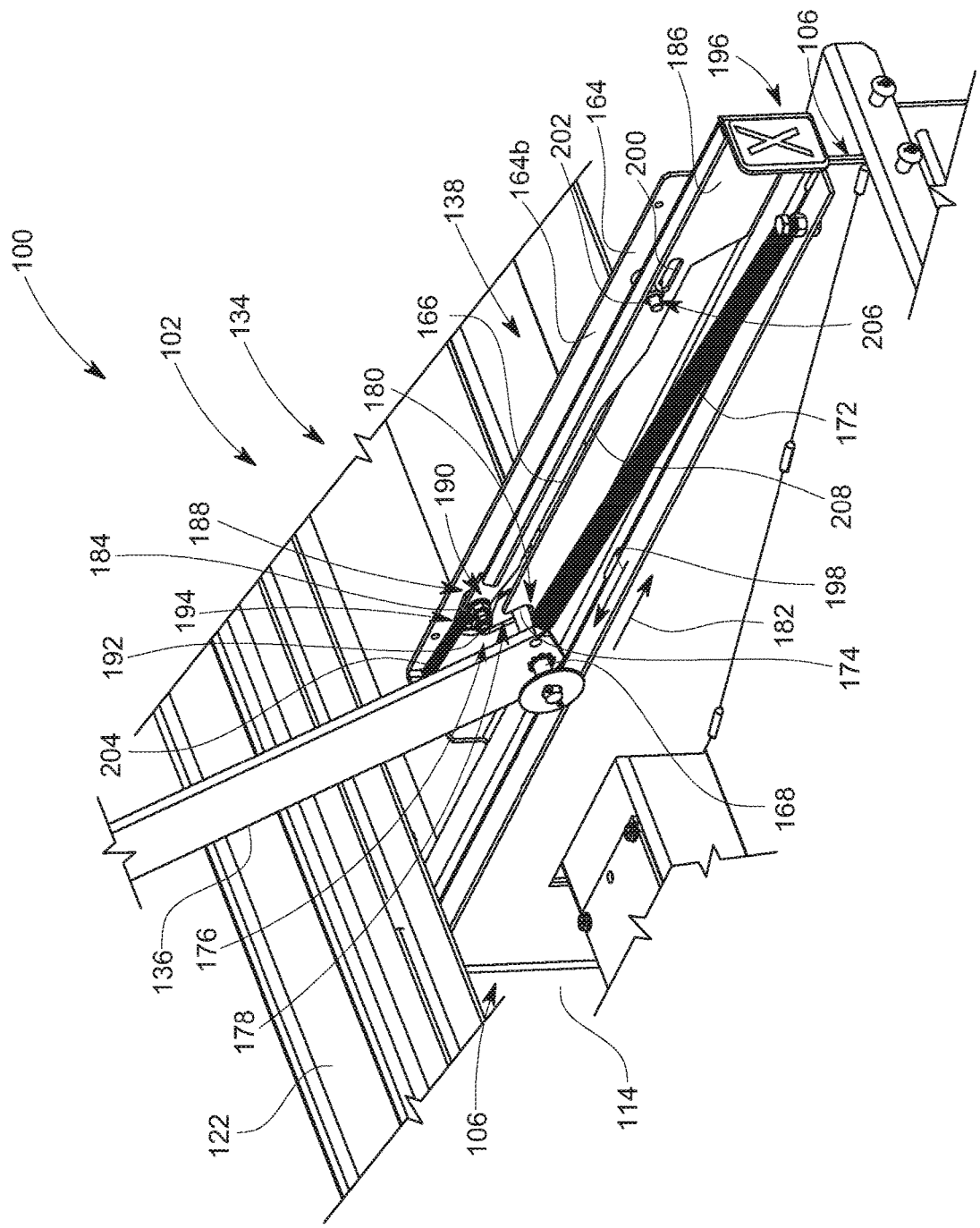
FIG. 5 is another perspective view of the cam lock mechanism and support member shown in FIG. 4 illustrating the support member in the extended position.
Figure 6:
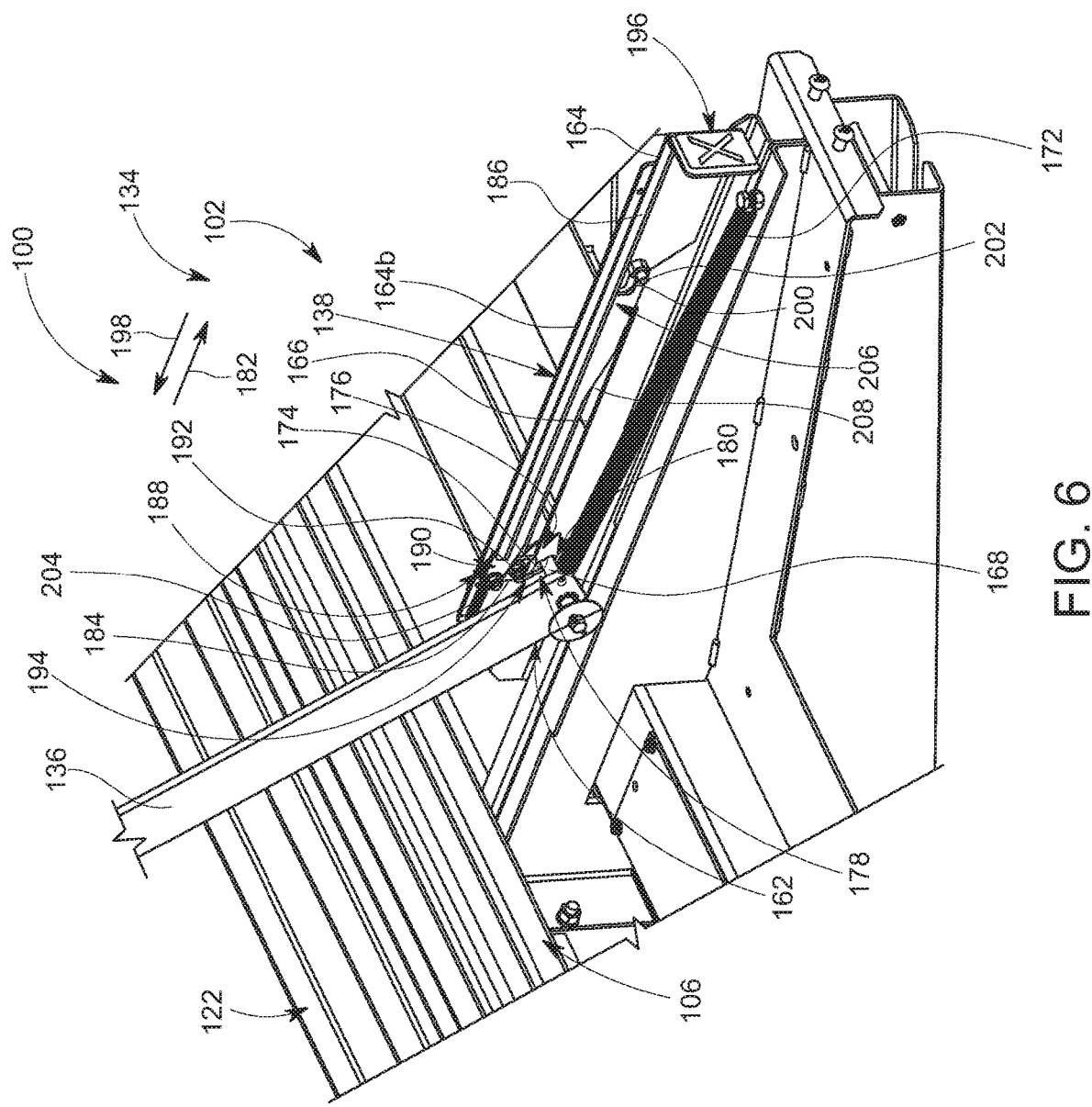
FIG. 6 is yet another perspective view of the cam lock mechanism and support member shown in FIGS. 4 and 5 illustrating the support member locked in the extended position.
Figure 7:
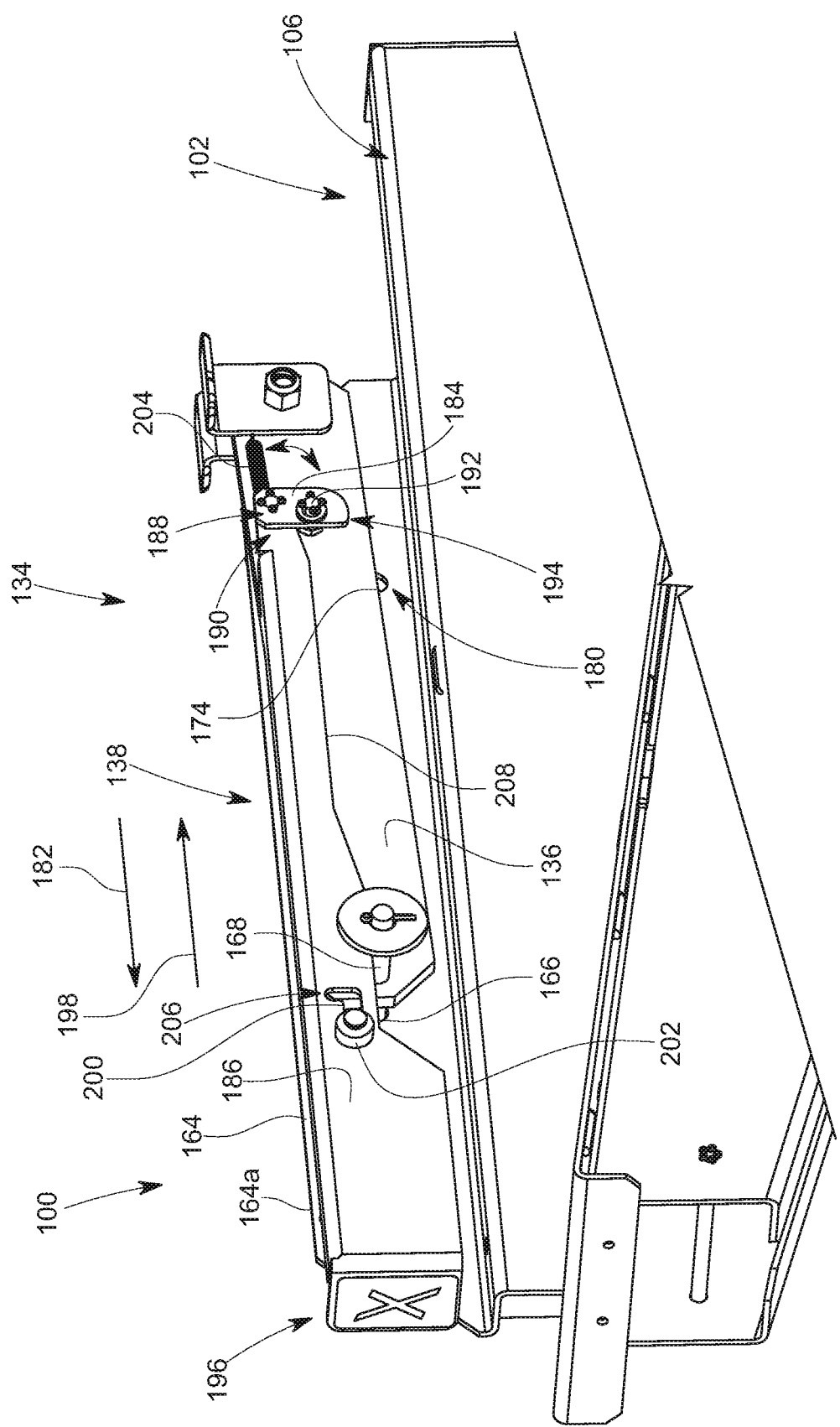
FIG. 7 is a perspective view illustrating the cam lock mechanism and a retracted position of the support member of the roof support system shown in FIG. 3 according to an exemplary embodiment.
Figure 8:
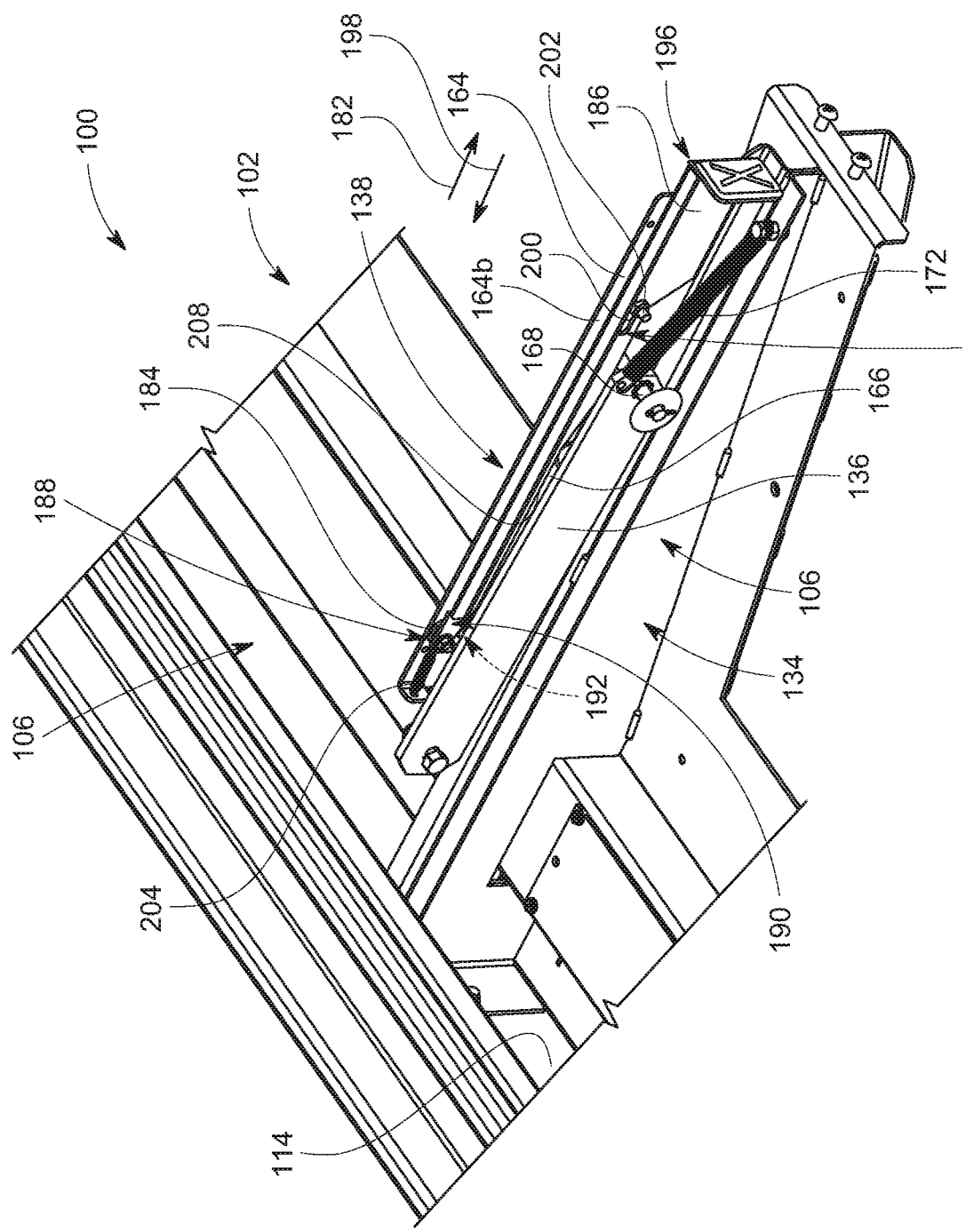
FIG. 8 is another perspective view of the cam lock mechanism and support member shown in FIG. 7 illustrating the support member in the retracted position.

Referring now to FIGS. 3-8, each support member 136 is movable between a retracted position and the extended position briefly described above. The extended position is shown in FIGS. 3-6, while the retracted position is shown in FIGS. 7 and 8. For clarity, the rail 164b has been removed from FIGS. 4 and 7 and the rail 164a has been removed from FIGS. 5, 6, and 8. The support members 136 are in the retracted position when the roof panel 122 (not shown in FIGS. 4, 5, 7, and 8) is in the closed position shown in FIG. 2. As briefly described above and will be described in more detail below, the extended position of the support members 136 support the roof panel 122 in the open position shown in FIG. 1.

Each support member 136 moves between the extended position and the retracted position by sliding along the length of the rails 164a and 164b of the corresponding cam lock mechanism 138 in the directions of the arrows 182 and 198. Specifically, the pin 168 at the end portion 162 of each support member 136 slides within the channels 166 (not visible in FIG. 4) along the length of the corresponding rails 164a and 164b such that the channels 166 guide the movement of the support member 136 between the retracted and the extended positions. As best seen in FIGS. 5, 6, and 8, the roof support system 134 optionally includes a biasing mechanism 172 (not visible in FIG. 7) operatively connected between the support member 136 and the frame 106 such that the biasing mechanism 172 biases the corresponding support member 136 to the retracted position. Although shown as being a coil spring, additionally or alternatively each biasing mechanism 172 may include any other type of biasing mechanism (e.g., another type of spring, etc.).

Referring now to FIGS. 5 and 6, the channel 166 of each rail 164 includes a slot 174 at an end portion 176 of the channel 166 that corresponds to the extended position of the support members 136. The slot 174 extends a length from an open end 178 to a closed end 180. When the support member 136 is in the extended position shown in FIGS. 3-6, the pin 168 of the support member 136 is received within the slot 174 of each corresponding rail 164. When received within the slot 174, engagement between the pin 168 and the closed end 180 of the slot 174 prevents the support member 136 from sliding along the length of the rails 164 in the direction 182 to thereby prevent the support member 136 from moving from the extended position toward the retracted position, as is shown in FIGS. 5 and 6. In other words, the engagement between the pin 168 of the support member 136 and the closed end 180 of the slot 174 holds (e.g., maintains, etc.) the support member 136 in the extended position. The extended position of the support members 136 thus supports the roof panel 122 in the open position (e.g., prevents the roof panel 122 from closing, etc.) against the weight of the roof panel 122, against other forces (e.g., wind forces, inadvertent force applied by a person or animal, etc.) acting to close the roof panel 122, despite failure of one or more of the gas springs 140 (shown in FIG. 1), and/or the like.

Referring again to FIGS. 3-8, the cam lock mechanisms 138 are operatively connected to the corresponding support members 136 such that the cam lock mechanisms 138 are configured to releasably lock the corresponding support members 136 in the extended positions. Each cam lock mechanism 138 includes a cam 184 (not visible in FIG. 3) and a release lever 186. The cam 184 is configured to rotate between a locking position shown in FIGS. 6-8 and a release position shown in FIGS. 4 and 5. More particularly, and referring now to FIGS. 4-8, an end portion 188 of the cam 184 is mounted to an end portion 190 of the release lever 186 for movement therewith (as will be described in more detail below). The cam 184 is mounted to the rail 164b at a pivot point 192 such that the cam 184 is configured to rotate about the pivot point 192 between the locking and release positions.

As will be described below and in shown in FIG. 6, in the locking position shown in FIG. 6-8, an end portion 194 of the cam 184 at least partially (e.g., sufficiently, etc.) blocks the open end 178 of the slot 174 of the rail 164b such that the pin 168 of the corresponding support member 136 is prevented from backing out of the slot 174 through the open end 178 of the slot 174. Referring now to FIG. 5, in the release position of the cam 184 shown in FIGS. 4 and 5, the end portion 194 of the cam 184 is at least partially (e.g., sufficiently, etc.) clear of the open end 178 of the slot 174 to enable the pin 168 to back out of the slot 174 through the open end 178 of the slot 174, as is shown in FIG. 5. Although each cam lock mechanism 138 is shown as including only a single cam 184 pivotally mounted to the rail 164b for at least partially blocking the open end 178 of the slot 174 of the rail 164b, in other embodiments one or more cam lock mechanisms 138 additionally or alternatively includes a cam (not shown) that is pivotally mounted to the rail 164a for at least partially blocking the open end 178 of the slot 174 of the rail 164a.

Referring again to FIGS. 4-8, the release lever 186 extends a length from a handle 196 to the end portion 190. The release lever 186 is mounted to the rail 164b for movement along the length of the rail 164b in the opposite directions 182 and 198 between an unlocked position shown in FIGS. 4 and 5 and a locked position shown in FIGS. 6-8. Specifically, the release lever 186 includes a guide slot 200 and the rail 164b includes a guide pin 202 that is received within the guide slot 200. The guide pin 202 guides movement of the release lever 186 along the length of the rail 164b in the directions 182 and 198. Movement of the release lever 186 along the length of the rail 164 in the directions 182 and 198 is configured to move the cam between the locking and release positions. More particularly, the end portion 188 of the cam 184 is mounted to the end portion 190 of the release lever 186, as is described above. Accordingly, when the release lever 186 is moved in the direction 198 from the unlocked position toward the locked position, the release lever 186 pushes the end portion 188 of the cam 184 in the direction 198 such that the cam 184 rotates from the release position to the locking position. Likewise, when the release lever 186 is moved in the direction 182 from the locked position toward the unlocked position, the release lever 186 pulls the end portion 188 of the cam 184 in the direction 182 such that the cam 184 rotates from the locking position to the release position.

In the exemplary embodiment, the cam lock mechanism 138 includes a biasing mechanism 204 that is operatively connected to the cam 184 such that the biasing mechanism 204 biases the cam 184 and the release lever 186 to the respective locking and locked positions thereof. Specifically, the biasing mechanism 204 is mounted to the rail 164*b* (and/or a portion of the frame 106) and is mounted to one or both of the cam 184 and the release lever 186 such that the biasing mechanism 204 is configured to bias the cam 184 and release lever 186 to the respective locking and locked positions. Although shown as being a coil spring, additionally or alternatively each biasing mechanism 204 may include any other type of biasing mechanism (e.g., another type of spring, etc.).

Figure 4:
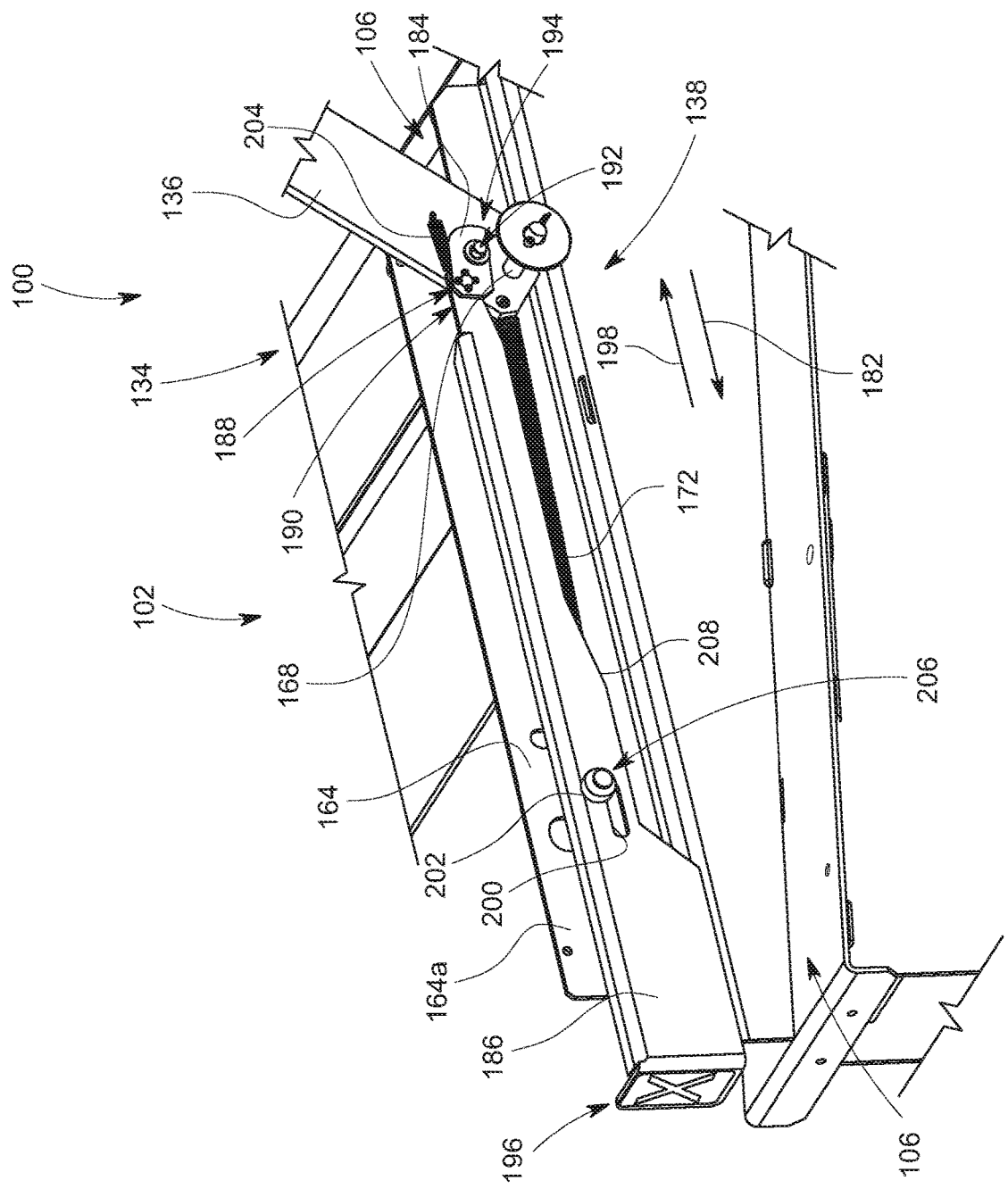
FIG. 4 is a perspective view illustrating a cam lock mechanism and an extended position of a support member of the roof support system shown in FIG. 3 according to an exemplary embodiment.

Optionally, the guide slot 200 of the release lever 186 includes an offset end 206 (best seen in FIG. 7) that facilitates holding (e.g., maintaining, etc.) the release lever 186 in the unlocked position shown in FIGS. 4 and 5 against the bias of the biasing mechanism 204. As shown in FIGS. 4-8, a lower edge 208 of the release lever 186 optionally includes a profile against which the pin 168 of the support member 136 rides as the support member 136 moves along the length of the rails 164 between the extended and retracted positions.

In operation, and referring now to FIGS. 1 and 2, a person opens the roof panel 122 by applying the lifting force to the roof panel 122 in the opening direction 128 to thereby move (e.g., lift, etc.) the roof panel 122 from the closed position shown in FIG. 2 toward the open position shown in FIG. 1. In some examples, the person opening the roof panel 122 applies the lifting force to the roof panel 122 using the hot stick 148. Use of the hot stick 148 enables the user to apply the lifting force to the roof panel 122 without directly engaging the roof panel 122, which may reduce the likelihood and/or severity of injury to the user caused by any electricity carried by the roof panel 122. Moreover, the hot stick 148 enables the user to apply the lifting force to the roof panel 122 from a predetermined distance away from the enclosure 10 and thereby avoid exposure to (e.g., contact with, etc.) electrically live components (e.g., the electrical components 104; the panels 108, 110, 112, 114, 122, and/or 130; the doors 118; etc.) of the electrical distribution system 100, for example exposure through the front opening 210 of the enclosure 102. In other examples, the person opening the roof panel 122 applies the lifting force to the roof panel 122 by directly engaging (e.g., grasping, pressing against, pushing, etc.) the roof panel 122, for example using insulated gloves, etc.

Referring now to FIGS. 3-8, as the roof panel 122 is lifted from the closed position shown in FIG. 2 toward the open position shown in FIG. 1, the support members 136 move from the retracted positions shown in FIGS. 7 and 8 toward the extended positions shown in FIGS. 4-6. The pins 168 of the support members 136 move along the length of the rails 164 of the cam lock mechanisms 138 in the direction 198 until the pins 168 reach the corresponding slot 174. As the pins 168 of the support members 136 reach the corresponding slots 174, the pins 168 engage the cam 184 of the corresponding cam lock mechanisms 138 such that the cam 184 is rotated away from the locking position to the release position, thereby enabling the pins 168 to enter the corresponding slot 174 through the open end 178 thereof. The reception of the pin 168 within the slot 174 is shown in FIGS. 5 and 6. The weight of the roof panel 122, the angle of the slot 174, and/or the bias of the biasing mechanism 172 may assist entry of the pins 168 within the slots 174.

Once the pins 168 are received within the slots 174, the support members 136 are in the extended positions and the roof panel 122 is in the open position. In the extended positions, engagement between the pins 168 and the closed ends 180 of the slots 174 prevents the support members 136 from sliding along the length of the rails 164 in the direction 182 such that the support members 136 support the roof panel 122 in the open position (e.g., prevent the roof panel 122 from closing, etc.) against the weight of the roof panel 122, against other forces (e.g., wind forces, inadvertent force applied by a person or animal, etc.) acting to close the roof panel 122, despite a failure of one or more the gas springs 140 (shown in FIG. 1), and/or the like. The extended position of the support members 136 thus prevent or reduce the likelihood and severity of injury to a person accessing the interior compartment 116 of the enclosure 102 caused accidental closure of the roof panel 122.

As each pin 168 enters the corresponding slot 174, the bias of the biasing mechanism 204 rotates the corresponding cam 184 to the locking position wherein the cam 184 at least partially (e.g., sufficiently, etc.) blocks the open end 178 of the slot 174, as is shown in FIG. 6. The locking position of the cam 184 thereby locks the support member 136 in the extended position by preventing the pin 168 from backing out of the corresponding slot 174 through the open end 178 thereof. Accordingly, the cam lock mechanisms 138 automatically lock the support members 136 in the extended positions as the roof panel 122 is moved from the closed position to the open position. When locked in the extended position, the cam lock mechanisms 138 prevent the pins 168 from backing out of the slots 174 against forces (e.g., wind forces, inadvertent force applied by a person or animal, etc.) acting in the opening direction 128 (shown in FIGS. 1 and 2) and thereby prevent the roof panel 122 from accidentally closing. The cam lock mechanisms 138 thus prevent or reduce the likelihood and severity of injury to a person accessing the interior compartment 116 of the enclosure 102 caused by accidental closure of the roof panel 122.

To close the roof panel 122, the support members 136 are unlocked from the extended positions by moving (e.g., pulling, etc.) the release levers 186 of the cam lock mechanisms 138 in the direction 182 to thereby rotate the cams 184 to the release positions. Once the cams 184 are in the release positions, the pins 168 of the support members 136 can be backed out of the slots 174 through the open ends 178 of the slots 174 by moving (e.g., lifting, etc.) the roof panel 122 in the opening direction 128 past the open position of the roof panel 122 to thereby release the support members 136 from the extended positions. The roof panel 122 can then be lowered to the closed position. As the roof panel 122 is lowered to the closed position, the support members 136 move from the extended position shown in FIGS. 4-6 to the retracted position shown in FIGS. 7 and 8. In some examples, a person moves the roof panel 122 in the opening direction past the open position of the roof panel 122 and/or lowers the roof panel 122 to the closed position using the hot stick 148.

Referring again to FIG. 1, the support members 136 and the cam lock mechanisms 138 of the roof support system 134 are not limited to the locations shown herein. For example, each support member 136 and the corresponding cam lock mechanism 138 can be positioned at any other location between the side panels 108 and 110 (e.g., along a width of the enclosure 102, etc.).

Figure 9:
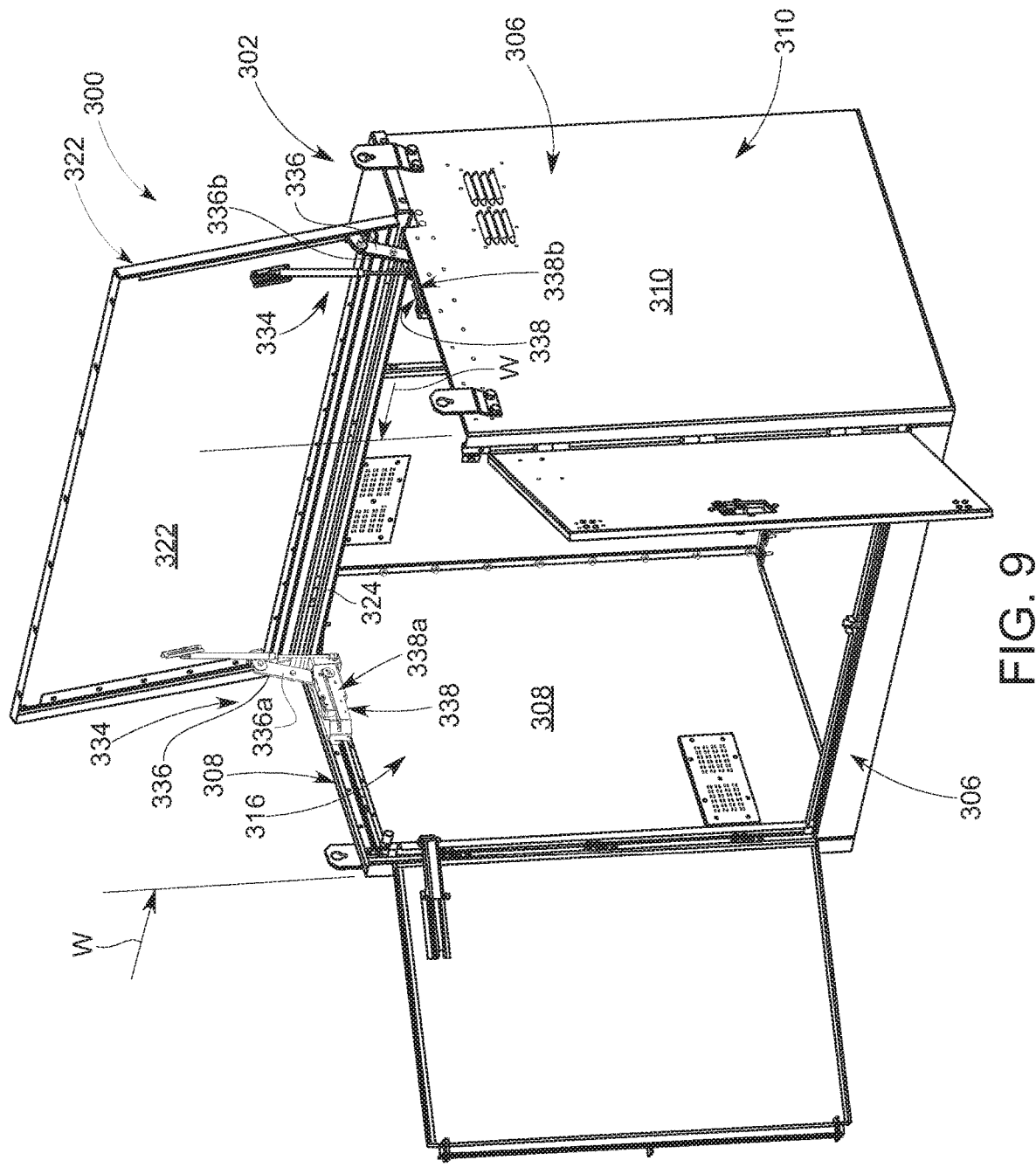
FIG. 9 is a perspective view illustrating an enclosure of an electrical distribution system according to another exemplary embodiment.
Figure 10:
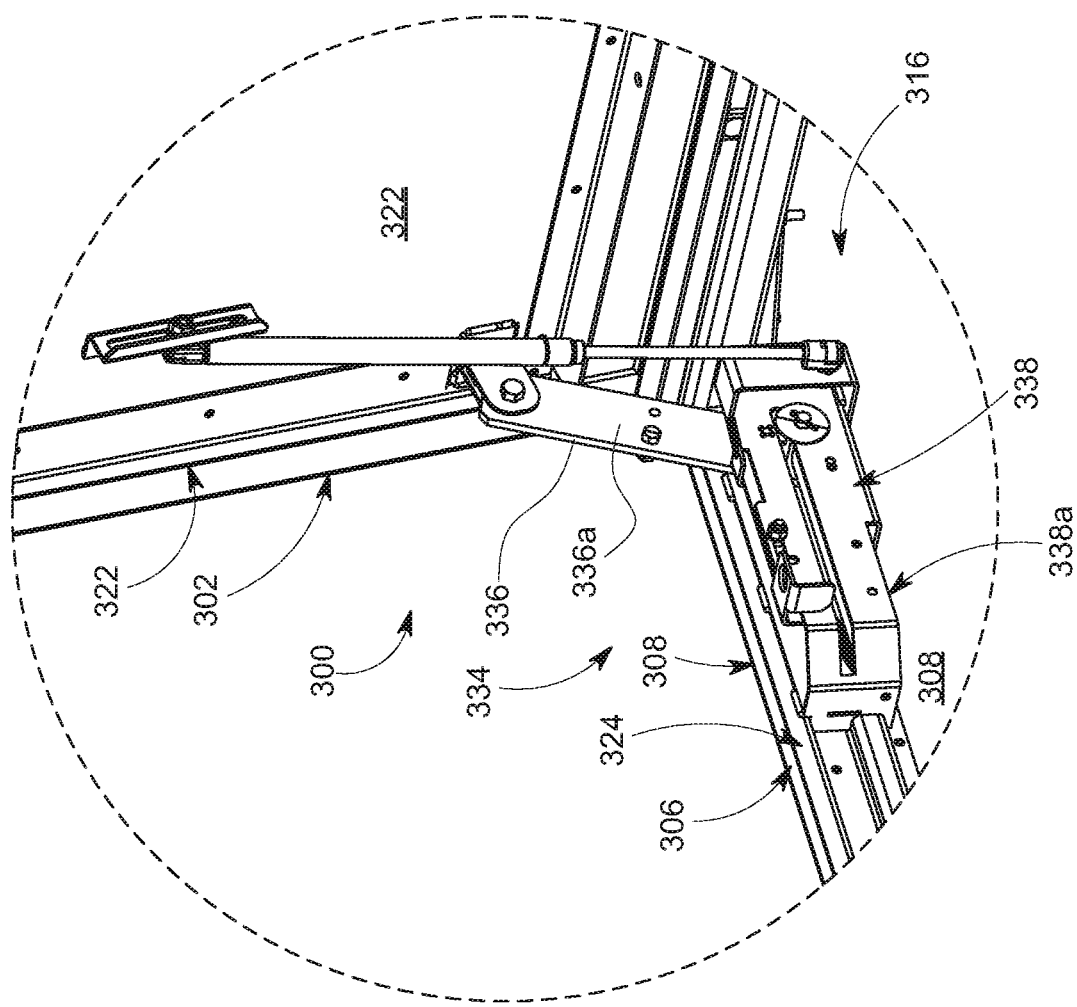
FIG. 10 is an enlarged perspective view of a portion of the enclosure shown in FIG. 9 illustrating a roof support system according to another exemplary embodiment.

FIGS. 9 and 10 are perspective views of an exemplary embodiment of another enclosure 302 of an electrical distribution system 300 illustrating other exemplary locations (e.g., positions, etc.) of support members 336 and cam lock mechanisms 338. The enclosure 302 is configured to house one or more electrical components (not shown) within an interior compartment 316 of a frame 306 of the enclosure 302. As shown in FIG. 9, the frame 306 extends a width W from a side panel 308 to an opposite side panel 310. The enclosure 302 includes a roof panel 322 mounted to the frame 306 for exposing the interior compartment 316 through an upper opening 324 of the frame 306. The roof panel 322 is movable between a closed position (not shown) and an open position (shown in FIGS. 9 and 10).

The enclosure 302 includes a roof support system 334 that includes one or more of the support members 336 and one or more of the corresponding cam lock mechanisms 338. The support members 336 move between extended positions that support the roof panel 322 in the open position and retracted positions when the roof panel 322 is in the closed position. The cam lock mechanisms 338 releasably lock the support members 336 in the extended positions. Operation of the roof support system 334 and the components thereof (e.g., the support members 336 and cam lock mechanisms 338, etc.) is substantially similar to the roof support system 134 shown in FIGS. 1-8 and therefore will not be descried in more detail herein. Although two are shown, the roof support system 334 may include any number of the support members 336 and corresponding cam lock mechanisms 338.

Each support member 336 and the corresponding cam lock mechanism 338 is located at (e.g., at least partially on, nearby, adjacent, etc.) a corresponding one of the side panels 308 or 310. Specifically, as is shown in FIG. 9, the roof support system 334 includes a support member 336a and corresponding cam lock mechanism 338a located at the side panel 308; and a support member 336b and corresponding cam lock mechanism 338b located at the side panel 310. For example, as best seen in FIG. 10, the cam lock mechanism 338a is mounted to the side panel 308.

Figure 11:
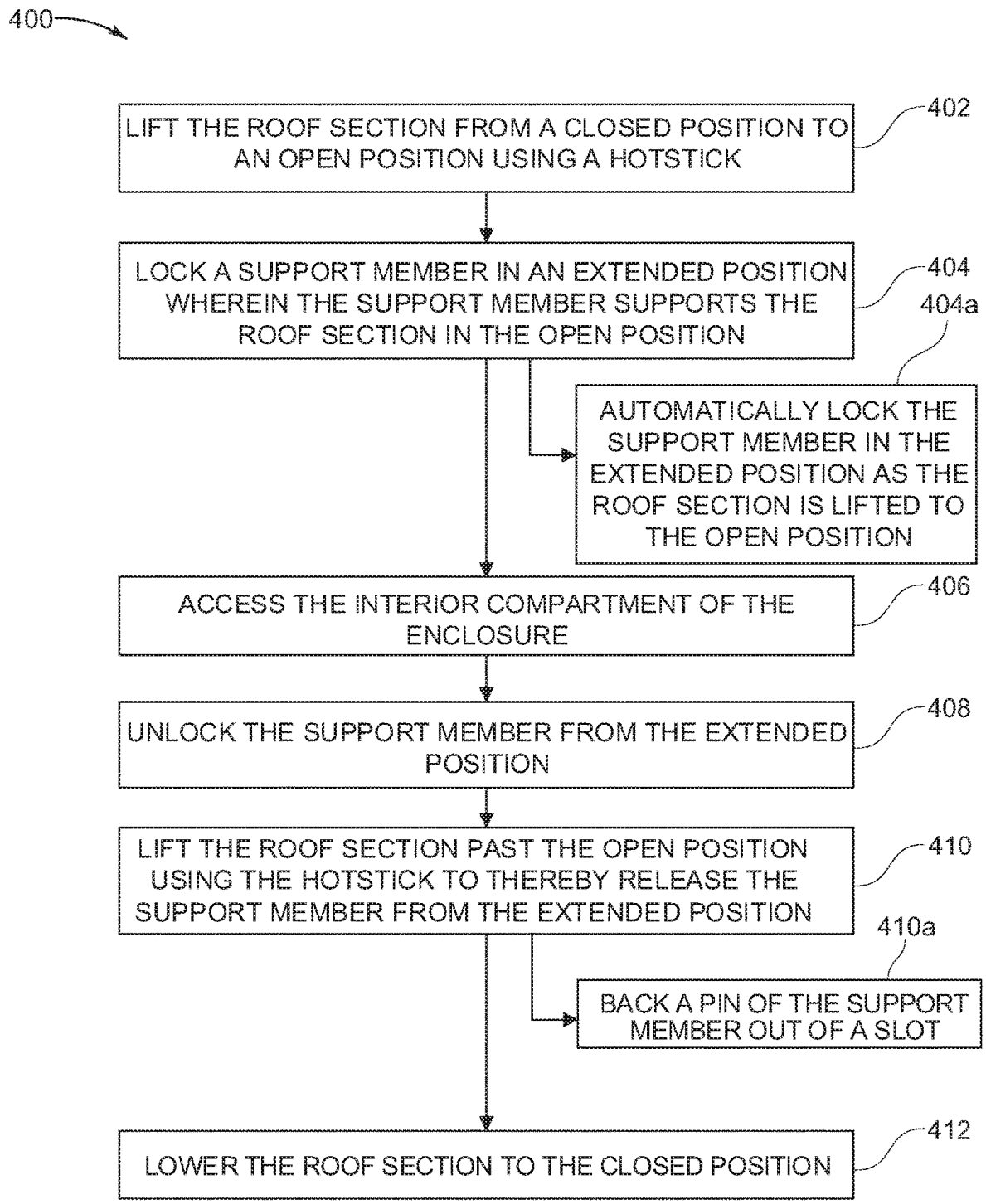
FIG. 11 is a flowchart illustrating a method for accessing an interior compartment of an electrical distribution system enclosure according to an exemplary embodiment.

FIG. 11 is a flowchart illustrating a method 400 for accessing an interior compartment of an electrical distribution system enclosure that includes a roof panel according to an exemplary embodiment. The method 400 includes lifting, at 402, the roof panel from a closed position to an open position using a hot stick. At 404, the method 400 includes locking a support member in an extended position wherein the support member supports the roof panel in the open position. In some examples, locking at 404 the support member in the extended position includes automatically locking, at 404a, the support member in the extended position as the roof panel is lifted to the open position. At 406, the method 400 includes accessing the interior compartment of the enclosure.

The method 400 further includes unlocking, at 408, the support member from the extended position. At 410, the method 400 includes lifting the roof panel past the open position using the hot stick to thereby release the support member from the extended position. In some examples, lifting at 410 the roof panel past the open position using the hot stick includes backing, at 410a, a pin of the support member out of a slot. At 412, the method 400 includes lowering, at 412, the roof panel to the closed position.

Certain embodiments of the disclosure provide a roof support system that reduces the amount of force required to lift and thereby open the roof panel of an electrical distribution system enclosure. Certain embodiments of the disclosure provide a roof support system that enables the roof panel of an electrical distribution system enclosure to be lifted and secured in an open position using less personnel. For example, certain embodiments of the disclosure provide a roof support system that enables the roof panel of an electrical distribution system enclosure to be safely lifted and secured in an open position by a single person.

Certain embodiments of the disclosure provide a roof support system that increases the safety of installation, servicing, and/or operation of components of electrical distribution systems. Certain embodiments of the disclosure thereby reduce the likelihood and severity of injury to personnel installing, servicing, and/or operating electrical distribution systems. For example, certain embodiments of the disclosure provide a roof support system that enables one or more personnel to safely lift and secure the roof panel of an electrical distribution system enclosure without being exposed to electrically live components (e.g., electrical components housed within the interior of the enclosure, portions of the enclosure carrying electricity, etc.). Moreover, and for example, certain embodiments of the disclosure provide a roof support system that can better withstand wind conditions and/or component failures such that the roof panels of electrical distribution systems are less likely to accidentally close onto personnel accessing interior compartments of electrical distribution system enclosures.

The following clauses describe further aspects of the disclosure, and any combination of the clauses is within the scope of the disclosure:

Clause Set A:

A1. A roof support system for an enclosure of an electrical distribution system, the roof support system comprising:

a support member configured to be mounted between a roof panel of the enclosure and a frame of the enclosure, the support member being movable between an extended position and a retracted position, the extended position of the support member being configured to support the roof panel in an open position of the roof panel, the support member being configured to be in the retracted position when the roof panel is in a closed position of the roof panel, the support member comprising a pin; and a cam lock mechanism operatively connected to the support member for releasably locking the support member in the extended position, the cam lock mechanism comprising a rail having a slot, the pin of the support member being received within the slot when the support member is in the extended position such that engagement of the pin with a closed end of the slot prevents the support member from moving from the extended position toward the retracted position, the cam lock mechanism comprising a cam configured to rotate between a locking position and a release position, wherein the locking position of the cam at least partially blocks an open end of the slot such that the pin of the support member is prevented from backing out of the slot.

A2. The roof support system of clause A1, wherein the cam lock mechanism comprises a release lever that is configured to move the cam from the locking position to the release position to unlock the support member from the extended position, the cam being at least partially clear of the open end of the slot of the rail in the release position to enable the pin of the support member to back out of the slot through the open end.

A3. The roof support system of clause A1, wherein the cam lock mechanism comprises a biasing mechanism operatively connected to the cam such that the biasing mechanism biases the cam to the locking position of the cam.

A4. The roof support system of clause A1, further comprising a hot stick having an electrically insulative body that extends a length from a handle to a tip, the tip being configured to engage the roof panel such that a user holding the hot stick can lift the roof panel from the closed position to the open position using the hot stick.

A5. The roof support system of clause A1, wherein an end portion of the support member slides along a length of the rail as the support member moves between the extended position and the retracted position.

A6. The roof support system of clause A1, wherein the cam lock mechanism is configured to automatically lock the support member in the extended position when the roof panel is moved to the open position.

A7. The roof support system of clause A1, further comprising at least one gas spring configured to be mounted between the roof panel and the frame of the enclosure, the gas spring being configured to provide an assisting force that assists movement of the roof panel from the closed position to the open position.

A8. The roof support system of clause A1, further comprising a biasing mechanism configured operatively connected to the support member such that the biasing mechanism is configured to bias the support member to the retracted position.

A9. The roof support system of clause A1, further comprising a hot stick having an electrically insulative body that extends a length from a handle to a tip, the tip being configured to be releasably connected to the roof panel.

Clause Set B:

B1. An enclosure for an electrical distribution system, the enclosure comprising:
 a frame having an interior compartment configured to hold at least one electrical component;
 a roof panel mounted to the frame at a hinge, the roof panel being movable about the hinge between a closed position that closes an upper opening of the frame and an open position that exposes the interior compartment through the upper opening; and
 a roof support system comprising:
  a support member configured to be mounted between the roof panel and the frame of the enclosure, the support member being movable between an extended position wherein the support member supports the roof panel in the open position and a retracted position when the roof panel is in the closed position, the support member comprising a pin; and
  a cam lock mechanism operatively connected to the support member for releasably locking the support member in the extended position, the cam lock mechanism comprising a rail having a slot, the pin of the support member being received within the slot when the support member is in the extended position such that engagement of the pin with a closed end of the slot prevents the support member from moving from the extended position toward the retracted position, the cam lock mechanism comprising a cam configured to rotate between a locking position and a release position, wherein the locking position of the cam at least partially blocks an open end of the slot such that the pin of the support member is prevented from backing out of the slot.

B2. The enclosure of clause B1, wherein the cam lock mechanism comprises a release lever that is configured to move the cam from the locking position to the release position to unlock the support member from the extended position, the cam being at least partially clear of the open end of the slot of the rail in the release position to enable the pin of the support member to back out of the slot through the open end.

B3. The enclosure of clause B1, wherein the cam lock mechanism comprises a biasing mechanism operatively connected to the cam such that the biasing mechanism biases the cam to the locking position of the cam.

B4. The enclosure of clause B1, further comprising a hot stick having an electrically insulative body that extends a length from a handle to a tip, the tip being configured to engage the roof panel such that a user holding the hot stick can lift the roof panel from the closed position to the open position using the hot stick.

B5. The enclosure of clause B1, wherein an end portion of the support member slides along a length of the rail as the support member moves between the extended position and the retracted position.

B6. The enclosure of clause B1, wherein the cam lock mechanism is configured to automatically lock the support member in the extended position when the roof panel is moved to the open position.

B7. The enclosure of clause B1, further comprising at least one gas spring mounted between the roof panel and the frame, the gas spring being configured to provide an assisting force that assists movement of the roof panel from the closed position to the open position.

B8. The enclosure of clause B1, wherein the roof panel is moved in an opening direction when the roof panel is moved from the closed position to the open position, the roof panel being configured to be moved in the opening direction past the open position to back the pin of the support member out of the slot of the rail and thereby enable the support member and the roof panel to move to the respective retracted and closed positions.

Clause Set C:

C1. A method for accessing an interior compartment of an electrical distribution system enclosure that includes a roof panel, the method comprising:
 lifting the roof panel from a closed position to an open position using a hot stick;
 locking a support member in an extended position wherein the support member supports the roof panel in the open position;
 accessing the interior compartment of the enclosure;
 unlocking the support member from the extended position;
 lifting the roof panel past the open position using the hot stick to thereby release the support member from the extended position; and
 lowering the roof panel to the closed position.

C2. The method of clause C1, wherein locking the support member in the extended position comprises automatically locking the support member in the extended position as the roof panel is lifted to the open position.

C3. The method of clause C1, wherein lifting the roof panel past the open position using the hot stick comprises backing a pin of the support member out of a slot.

It is to be understood that the above description is intended to be illustrative, and not restrictive. For example, the above-described embodiments (and/or aspects thereof) may be used in combination with each other. Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Further, each independent feature or component of any given assembly may constitute an additional embodiment. In addition, many modifications may be made to adapt a particular situation or material to the teachings of the disclosure without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the disclosure should, therefore, be determined with reference to the appended claims, along with the full scope of equivalents to which such claims are entitled.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "clockwise" and "counterclockwise", "left" and right", "front" and "rear", "above", "below", "upper", and "lower" and the like are used as words of convenience to provide reference points and are not to be construed as limiting terms.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. For example, in this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised", "comprises", "having", "has", "includes", and "including" where they appear. Further, references to "one embodiment" or "one aspect" are not intended to be interpreted as excluding the existence of additional embodiments or aspects that also incorporate the recited features. Moreover, unless explicitly stated to the contrary, embodiments "comprising" or "having" an element or a plurality of elements having a particular property can include additional elements not having that property. The term "exemplary" is intended to mean "an example of" The phrase "one or more of the following: A, B, and C" means "at least one of A and/or at least one of B and/or at least one of C." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Although the terms "step" and/or "block" may be used herein to connote different elements of methods employed, the terms should not be interpreted as implying any particular order among or between various steps herein disclosed unless and except when the order of individual steps is explicitly described. The order of execution or performance of the operations in examples of the disclosure illustrated and described herein is not essential, unless otherwise specified. The operations may be performed in any order, unless otherwise specified, and examples of the disclosure may include additional or fewer operations than those disclosed herein. It is therefore contemplated that executing or performing a particular operation before, contemporaneously with, or after another operation is within the scope of aspects of the disclosure.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A roof support system for an enclosure of an electrical distribution system, the roof support system comprising:
    a support member configured to be mounted between a roof panel of the enclosure and a frame of the enclosure, the support member being movable between an extended position and a retracted position, the extended position of the support member being configured to support the roof panel in an open position of the roof panel, the support member being configured to be in the retracted position when the roof panel is in a closed position of the roof panel, the support member comprising a pin; and
    a cam lock mechanism operatively connected to the support member for releasably locking the support member in the extended position, the cam lock mechanism comprising a rail having a channel that extends along a length of rail, the channel comprising a slot that extends a length from an open end to a closed end, the pin of the support member being received within the slot when the support member is in the extended position such that engagement of the pin with the closed end of the slot prevents the support member from moving from the extended position toward the retracted position, the cam lock mechanism comprising a cam configured to rotate between a locking position and a release position, wherein the locking position of the cam at least partially blocks the open end of the slot such that the pin of the support member is prevented from backing out of the slot.

2. The roof support system of claim 1, wherein the cam lock mechanism comprises a release lever that is configured to move the cam from the locking position to the release position to unlock the support member from the extended position, the cam being at least partially clear of the open end of the slot of the rail in the release position to enable the pin of the support member to back out of the slot through the open end.

3. The roof support system of claim 1, wherein the cam lock mechanism comprises a biasing mechanism operatively connected to the cam such that the biasing mechanism biases the cam to the locking position of the cam.

4. The roof support system of claim 1, wherein an end portion of the support member slides along a length of the rail as the support member moves between the extended position and the retracted position.

5. The roof support system of claim 1, wherein the cam lock mechanism is configured to automatically lock the support member in the extended position when the roof panel is moved to the open position.

6. The roof support system of claim 1, further comprising at least one gas spring configured to be mounted between the roof panel and the frame of the enclosure, the gas spring being configured to provide an assisting force that assists movement of the roof panel from the closed position to the open position.

7. The roof support system of claim 1, further comprising a biasing mechanism configured operatively connected to the support member such that the biasing mechanism is configured to bias the support member to the retracted position.

8. The roof support system of claim 1, further comprising a hot stick having an electrically insulative body that extends a length from a handle to a tip, the tip being configured to be releasably connected to the roof panel.

9. A roof support system for an enclosure of an electrical distribution system, the roof support system comprising:
 a support member configured to be mounted between a roof panel of the enclosure and a frame of the enclosure, the support member being movable between an extended position and a retracted position, the extended position of the support member being configured to support the roof panel in an open position of the roof panel, the support member being configured to be in the retracted position when the roof panel is in a closed position of the roof panel, the support member comprising a pin;
 a cam lock mechanism operatively connected to the support member for releasably locking the support member in the extended position, the cam lock mechanism comprising a rail having a slot, the pin of the support member being received within the slot when the support member is in the extended position such that engagement of the pin with a closed end of the slot prevents the support member from moving from the extended position toward the retracted position, the cam lock mechanism comprising a cam configured to rotate between a locking position and a release position, wherein the locking position of the cam at least partially blocks an open end of the slot such that the pin of the support member is prevented from backing out of the slot; and
 a hot stick having an electrically insulative body that extends a length from a handle to a tip, the tip being configured to engage the roof panel such that a user holding the hot stick can lift the roof panel from the closed position to the open position using the hot stick.

10. An enclosure for an electrical distribution system, the enclosure comprising:
 a frame having an interior compartment configured to hold at least one electrical component;
 a roof panel mounted to the frame at a hinge, the roof panel being movable about the hinge between a closed position that closes an upper opening of the frame and an open position that exposes the interior compartment through the upper opening; and
 a roof support system comprising:
  a support member configured to be mounted between the roof panel and the frame of the enclosure, the support member being movable between an extended position wherein the support member supports the roof panel in the open position and a retracted position when the roof panel is in the closed position, the support member comprising a pin; and
  a cam lock mechanism operatively connected to the support member for releasably locking the support member in the extended position, the cam lock mechanism comprising a rail having a slot, the pin of the support member being received within the slot when the support member is in the extended position such that engagement of the pin with a closed end of the slot prevents the support member from moving from the extended position toward the retracted position, the cam lock mechanism comprising a cam configured to rotate between a locking position and a release position, wherein the locking position of the cam locks the support member in the extended position by preventing the pin of the support member from backing out of the slot.

11. The enclosure of claim 10, wherein the cam lock mechanism comprises a release lever that is configured to move the cam from the locking position to the release position to unlock the support member from the extended position, the cam being at least partially clear of an open end of the slot of the rail in the release position to enable the pin of the support member to back out of the slot through the open end.

12. The enclosure of claim 10, wherein the cam lock mechanism comprises a biasing mechanism operatively connected to the cam such that the biasing mechanism biases the cam to the locking position of the cam.

13. The enclosure of claim 10, further comprising a hot stick having an electrically insulative body that extends a length from a handle to a tip, the tip being configured to engage the roof panel such that a user holding the hot stick can lift the roof panel from the closed position to the open position using the hot stick.

14. The enclosure of claim 10, wherein an end portion of the support member slides along a length of the rail as the support member moves between the extended position and the retracted position.

15. The enclosure of claim 10, wherein the cam lock mechanism is configured to automatically lock the support member in the extended position when the roof panel is moved to the open position.

16. The enclosure of claim 10, further comprising at least one gas spring mounted between the roof panel and the frame, the gas spring being configured to provide an assisting force that assists movement of the roof panel from the closed position to the open position.

17. The enclosure of claim 10, wherein the roof panel is moved in an opening direction when the roof panel is moved from the closed position to the open position, the roof panel being configured to be moved in the opening direction past the open position to back the pin of the support member out of the slot of the rail and thereby enable the support member and the roof panel to move to the respective retracted and closed positions.

* * * * *